(12) United States Patent
Ostergren

(10) Patent No.: US 8,979,460 B2
(45) Date of Patent: Mar. 17, 2015

(54) FASTENING DEVICE

(75) Inventor: Kristian Ostergren, Alingsas (SE)

(73) Assignee: ITW Sverige AB, Moelndal (SE)

(*) Notice: Subject to any disclaimer, the term of this patent is extended or adjusted under 35 U.S.C. 154(b) by 919 days.

(21) Appl. No.: 12/668,278

(22) PCT Filed: Jul. 7, 2008

(86) PCT No.: PCT/SE2008/050845
§ 371 (c)(1),
(2), (4) Date: Jan. 8, 2010

(87) PCT Pub. No.: WO2009/008824
PCT Pub. Date: Jan. 15, 2009

(65) Prior Publication Data
US 2010/0322743 A1 Dec. 23, 2010

(30) Foreign Application Priority Data

Jul. 9, 2007 (SE) .................................. 0701677.7

(51) Int. Cl.
*F16B 21/08* (2006.01)
(52) U.S. Cl.
CPC .............. *F16B 21/084* (2013.01); *F16B 21/086* (2013.01)
USPC ........................................... 411/508; 24/453
(58) Field of Classification Search
CPC .. F16B 13/124; F16B 19/1081; F16B 13/126; F16B 13/122; F16B 37/043; F16B 29/00; F16B 21/086; F16B 5/065; F16B 5/0642; F16B 21/088; F16B 21/08; F16B 5/0657; F16B 21/084; F16B 19/004; F16B 37/044; F16B 5/128; F16B 5/125; F16B 5/126; F16B 2/241; B60R 13/0206; B60J 10/0051; B60J 10/0062; H05K 7/142; D06F 55/00; H01L 23/4093; A47C 21/022; A47H 19/00; A47G 11/006

USPC ........... 24/289, 292, 293, 297, 453, 457, 458; 411/80.1, 80.2, 508–510, 913
See application file for complete search history.

(56) References Cited

U.S. PATENT DOCUMENTS 3,177,540 A    4/1965  Hall et al.
3,745,612 A *  7/1973  Seckerson .................... 411/509
(Continued)

FOREIGN PATENT DOCUMENTS

DE    102004001898 B3    5/2005
EP    0726400 A1    8/1996
(Continued)

OTHER PUBLICATIONS

ISR for PCT/SE2008/050845 mailed Sep. 24, 2008.

*Primary Examiner* — Gay Ann Spahn
(74) *Attorney, Agent, or Firm* — Lowe Hauptman & Ham LLP

(57) ABSTRACT

A fastening device comprising a main portion having a base end portion and a distal end portion wherein its base end is attached to a head intended to be in contact with a rim at the outer side of an aperture when the fastening device is located in the aperture. The main portion is provided with guiding elements in order to guide the fastening device when inserted into the aperture and resilient elements which during insertion will be pressed inwards in order to at a later stage, when the resilient elements have passed the rim of the aperture, resiliently move back and thus provide a locking of the fastening device by being in contact with the rim on the inside of the aperture. The guiding element is provided with at least three vanes which are attached at its bases to the head such that they are located at an essentially equidistant spacing from the centre point. The resilient elements are made up by segments which only are attached to the fastening device along one side of the segments to the vanes such that they are protruding from the vanes and extend in a direction towards an adjacent vane.

23 Claims, 9 Drawing Sheets

(56) References Cited

U.S. PATENT DOCUMENTS

| | | | |
|---|---|---|---|
| 3,776,495 A * | 12/1973 | Hartz et al. | 248/71 |
| 3,905,270 A | 9/1975 | Hehl | |
| 4,778,320 A * | 10/1988 | Nakama | 411/509 |
| 4,987,656 A * | 1/1991 | Sato | 24/297 |
| 5,301,396 A | 4/1994 | Benoit | |
| 5,573,362 A * | 11/1996 | Asami et al. | 411/509 |
| 5,651,634 A * | 7/1997 | Kraus | 403/408.1 |
| 5,658,110 A | 8/1997 | Kraus | |
| 6,305,055 B1 * | 10/2001 | Castro | 24/458 |
| 6,752,950 B2 | 6/2004 | Clarke | |
| 7,549,829 B2 * | 6/2009 | Okada et al. | 411/508 |
| 7,967,539 B2 * | 6/2011 | Huet | 411/508 |
| 2005/0244250 A1 * | 11/2005 | Okada et al. | 411/508 |
| 2009/0188086 A1 * | 7/2009 | Okada et al. | 24/297 |

FOREIGN PATENT DOCUMENTS

| | | |
|---|---|---|
| GB | 2006318 A | 5/1979 |
| GB | 2026083 A | 1/1980 |

* cited by examiner

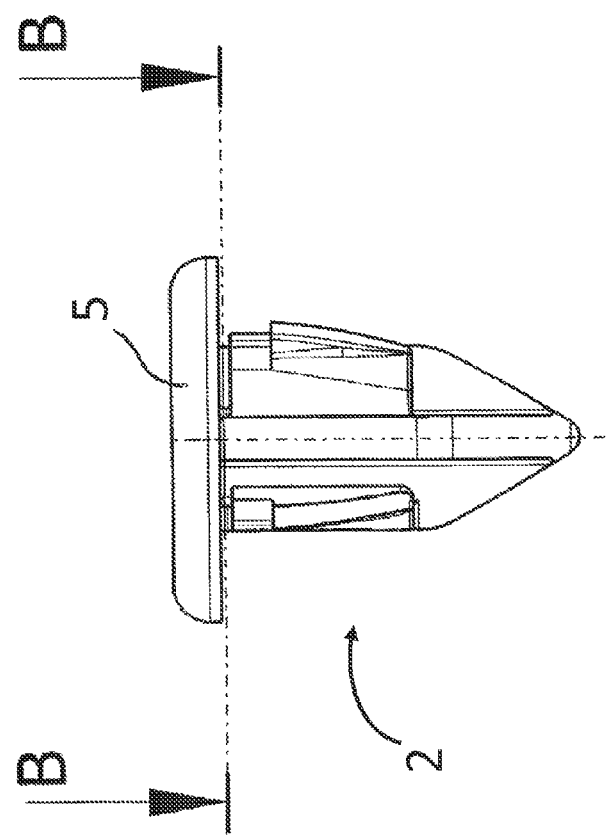

FASTENING DEVICE

RELATED APPLICATIONS

The present application is national phase of PCT/SE2008/050845 filed Jul. 7, 2008, and claims priority from Swedish Application Number 0701677-7 filed Jul. 9, 2007, the disclosures of which are hereby incorporated by reference herein in their entirety.

TECHNICAL FIELD

The invention relates to a fastening device (clip) which is used to attach different elements to each other, for example when mounting interior panels onto vehicles.

BACKGROUND ART

In order to join together devices, for example attachment of different kinds of panels in vehicles, screw joint reinforcements have earlier traditionally been used. However, screw joint reinforcements suffer from a number of disadvantages. The head of the screw will remain visible after attachment and should in some way be hidden or a less aesthetic appearance of the installation must be accepted. Furthermore, the mounting of a screw joint reinforcement is time consuming. In addition, such a mounting must be made manually why the use of a screw joint reinforcement in a manufacturing process is an obstacle concerning an automatization of the process.

An increased interest in reducing mounting time and enabling automatization of the mounting has encouraged the search for alternatives to screw joint reinforcements. Resilient fastening devices, usually called clips, have therefore been set out to be used for certain purposes. Clips are available in a numerous of different models and different materials. A kind of fastening devices which are commonly used is a two part fastening device made by a plastic material having a male and a female part for snap fitting with each other and each one provided with means for attachment in a panel and a part of the car, respectively. The use of such resilient fastening devices solves at least partly the above described problems concerning the aesthetic appearance. In order to further improve the performance and shorten the mounting time it has been common practice to use fastening devices which only comprise one part, so called "one-piece fasteners". Clips of this kind, which work perfectly well, are cheap and easy to mount and are thus requested today, mainly in the automotive industry but also in other kind of industry having a desire to attach parts to each other or attach safety panels and this kind of fastening devices are thus desired in order to make a production process more efficient.

However, there are several problems associated with the manufacturing of these clips today in accordance with the demands from the users who require that the clips shall be user friendly designed and easy to mount while at the same time they shall not detach once they are put in their proper place. The clips shall also be cheap which implies the requirement that they shall be easy to manufacture. In addition, they shall preferably only comprise one part, and not having a second part which is manufactured and adapted to be an anchor to be safely attached to as was common earlier, which implies that the clips only comprising one part must be able to be put in place and provide a desired attachment strength in prefabricated hole which may have rather large tolerances. It is also a risk that such holes have sharp edges which may damage the clip or make the insertion of the clip in the hole more difficult such that the clip may be askew and thus will be subject to an extra force in order to be able to place the clip in its intended position.

A frequently method used today for the manufacturing of a clip is to produce them by compression moulding or die-casting using a plastic material. The demand that this shall be possible to perform in a cheap and cost effective way implies that the clip may not have too complicated geometries and it shall be possible to mould it in a one-step-process. The production is further complicated due to the fact that the clips are rather small (a standard diameter for a mounting hole in the automotive industry today is 8 mm) which makes it difficult to fill out small cavities in a mould and to get rid of excess material if the design not support this. Further requirements of the clips are that they shall be robust, not only in the sense of staying in its position, but also that they shall also withstand the mounting procedure in a good way and not be damaged by for example an impact which may break it or weaken it at the time of mounting if it is not correctly inserted or is handled carelessly. In order to avoid such handling of the clip at mounting is it important that the insertion force resistance is not too large.

There are a number of known fastening devices (clips) which are used to attach different elements to each other which intend to comply with one or several of the above desires. In U.S. Pat. No. 6,752,950 is a clip described which is made by using two materials in order to provide the desired properties. However, this implies a fairly complicated process for manufacturing and it implies the clip needs a longer time to be produced and a more time consuming process. In U.S. Pat. No. 3,905,270 is described a clip which is manufactured by injection moulding and has a geometry provided with three spring legs in order to assure a reliable insertion into, and attachment to, the hole. This clip is designed to be able to be manufactured in an easy way and to be attached safely. However, experience has shown that this kind of clips are fairly easy damaged if it is inserted askew and one of the spring legs may be damaged if it is located askew or subject to a too large force during insertion. In U.S. Pat. No. 5,301,396 it is proposed to make the insertion of the clip into a hole easier by adding a ring through which the clip must be pressed when it shall be attached to a hole which thus helps to facilitate that the clip easily may be put in its position without being damaged. However, this solution implies the need of an extra part in order to attach the clip and render manufacturing and attachment more complicated since two parts are needed. Further examples of clips are disclosed in U.S. Pat. No. 3,177,540 in which a number of flexible flanges are compressed when inserted in a hole. Also GB 2,026,083 shows a clip which is intended to in an easy way be fitted in a round hole by being provided with a number of flanges, for example 3, which shall guide and locate the clip such that it is positioned in its desired position so as to attach two parts in a confident way.

All these clips disclose different solutions of how different kinds of clips may be designed and different solutions concerning clips of today. However, these clips are not considered to be of the desired quality and/or not being easy enough to handle when mounting why there is a remaining desire of an improved clip which is easy to manufacture and mount, preferably a one-piece-clip, and provides a secure mounting with a reduced risk of being damaged or to break at mounting.

DISCLOSURE OF INVENTION

The clip described in one embodiment of the invention provides a solution to the above described problems. The invention thus relates a clip or fastening device comprising a main portion having an essentially axial extension from one of its end portions (base end) to its other end portion (distal end). The main portion is intended to at least partly be inserted into an aperture or a slot, for example a mounting slot for an interior panel in a vehicle door, which has a size adapted to the fastening device and a head, attached to the main portion at one of its end portions (base end).

The head is intended to be adapted to be in contact with, directly or indirectly, the rim of the outer side of the aperture when the fastening device is located in the aperture such that it may not be inserted further in the aperture than what is intended. Worth notifying is that even if it is possible that the main portion itself may extend further on through the head, it is meant by base end the part of main portion which is in contact with and is attached to the main portion and the part which may be penetrating through the head is in this case considered to be another portion.

Furthermore comprises the main portion guiding elements in order to guide the fastening device when inserting the fastening device through a slot or mounting aperture and, in addition, resilient elements. The resilient elements are intended to be inserted into the aperture as far as they will provide a locking of the fastening device. The main portion is thus inserted into the aperture such a distance that the resilient elements will be located in its locking position. When the main portion of the fastening device is inserted into the aperture will the resilient elements be compressed and pressed radially inwards towards the centre of the main portion in order to at a later stage, when the resilient elements have passed the edge of the hole, resiliently move back and thus provide a locking of the fastening device by being in contact with the rim on the inside of the aperture. It is not necessary that the resilient elements completely pass by the rim of the aperture but they may for example be provided with one or several shoulders such that the elements are adapted to be able to be used for elements (e.g. panels, plates, covers and the like) having different thickness which shall be attached to each other or onto load bearing structures. The fastening device is thus located in its locking position and its head prevents that the fastening device will enter completely through the aperture and the resilient elements prevents that the fastening device will slip back through the aperture and out of the aperture once again.

Furthermore, the guiding element comprises at least 3 vanes (i.e. flanges, panels, walls, wedges or the like support structures) which are attached to the fastening device. These vanes are intended to guide the fastening device into its desired position in the aperture such that the peripheral parts of the vane are adapted to be positioned along a periphery of an imaginary circle having its centre in the centre point of the main portion. At the head of the fastening device should the circle, which is made up of the peripheral points of the vane and having its centre in the main portion, have a diameter essentially corresponding to the diameter of the aperture. In order to be able to achieve desired centering is it generally considered that the radially peripheral parts of the vanes, as viewed from the centre point of the main portion, are located essentially at an equidistant spacing from the centre point at the main portion and thus are located essentially at the same periphery in an imagined circle around the main portion. A well conditioned fitting in is often particularly important in the last phase of the insertion of the fastening device since it is often needed a larger force in order to place the fastening device on its location in the last moment why it is important that the guiding is working well and the fitting in of the bases of the vanes at the head of the fastening devices is fairly tight in order to avoid that the fastening device enters slantingly. In order to provide a well functioning guiding system of the fastening device, which may rigidly absorb forces and impacts without resulting in damage or breaking of the fastening device, is the guiding function, i.e. the guiding elements, separated from the elements which provides the snap-in locking, i.e. the resilient elements. In many cases are these made up of the same element which results in, when there is a heavy pressure or load on the fastening device in order to guide it properly, there is a great risk that the guiding elements, which also are the snap-in locking elements, may be damaged. Since the snap-in locking elements must be flexible and able to bend in the guiding direction, i.e. in the direction of centering the fastening device in the aperture, and since this is the same direction in which they shall be able to resiliently be compressed in order to enter through the aperture and later on resiliently move back into a locking position, is it hard to combine these two functions in one single element. A well working centering implies rigid elements which in this case will contribute to difficulties in inserting the fastening device. By separating the elements will it thus be possible to make the guiding arrangement rigid and obtain an excellent guiding without the need to compromise with the flexibility, and thus less resistance in the in the desired guiding direction, something which is necessary for the flexible elements which function as snap-in and locking arrangement. Due to this separation of the different elements, this solution provides a possibility to a new design and attachment of the resilient elements. The resilient elements comprise segments which only are attached to the fastening device along one side of the segment to the vanes such that they are protruding from the vanes and extend in a direction towards an adjacent vane. It is thus not necessary that they are attached to any other part of the fastening device, which is of a great advantage for the function of the fastening device. The segments which will form the resilient elements are thus only attached along one edge and are thus very flexible, particularly at the side furthest away from the side which is attached. Furthermore, the flexible segment is attached along an edge which extends essentially parallel to the axial extension of the fastening device (i.e. the axial direction of the main portion) which also is the same as the direction of insertion when the fastening device is pushed into the mounting aperture. In most cases is the segment attached at some of its sides which is perpendicular to, or essentially perpendicular to, the direction of insertion. Such an attachment often makes it difficult to distribute the need of forces under the insertion procedure in order to push the fastening device into its locking position. A typical configuration is that the clips, or the flexible elements, are attached to or adjacent to the head of the fastening devices. In such a case are the resilient elements fairly flexible in the first phase of the insertion into the aperture, i.e. when the resilient element is in contact with the rim and there is a fairly long distance between the contact surface and the attachment to the fastening device. However, this distance (between the attachment to the fastening device and the contact with the rim of the aperture) will decrease as the fastening device is inserted into the aperture and the flexible element will be most rigid just before it is located in its locking position. This problem is overcome by the present invention. Since the resilient element is attached to the guiding arrangement along an edge of a vane which is essentially parallel to the axial direction of the fastening device and thus also to the direction of insertion, may the resilient element be designed such that the distance between its attachment to the fastening device and the contact surface with the edge of the aperture is essentially constant. According to an embodiment is the resilient element designed such that its distal side, i.e. the side of the element which is furthest away from the side attached to the fastening device, is the part of the element which is in contact with the edge of the aperture under the complete insertion procedure. This may be obtained by for example placing a wedge shaped element on the side facing radially outwards, along the distal edge of the resilient element, such that it always will be the part of the resilient element which is furthest away from the attachment which will be in contact with the edge of the aperture and thus provides a flexible contact with the aperture when inserting the fastening device into the aperture and a sufficient and controlled friction for the complete insertion distance when the clip is inserted while the edge of the aperture is in contact with the resilient segment. Fastening devices which are shaped such that the resilient elements are attached to the vanes along a line which essentially extends along the axial direction of the fastening devices and the main portion are thus preferred. Another way of expressing this is to disclose that the resilient elements should be attached to the vanes along a line which essentially not extends in a direction which is perpendicular to the extension of the main portion in the axial direction.

The present fastening device and its fairly simple construction results in that it may be easy to produce in a one-step process by injection moulding or compression moulding. Furthermore, its unique design provides a safe insertion in a mounting aperture associated with a very small risk to damage any part of the fastening device while at the same time the force needed to insert and mount may be distributed such that the force will be fairly evenly distributed during the entire insertion procedure of the fastening device in the mounting aperture.

According to one embodiment is the fastening device designed such that the vanes, which are used to form the guiding element, are shaped such that their extension in the radial direction decreases along its extension in axial direction from the base end of the main portion to the distal end of the main portion. The vanes are thus shaped such that a projection of a circle, perpendicular to the axial direction of the main portion, having its centre in the middle of the main portion and a periphery at the distal end of the vanes along the axial extension of the main portion, forms a more or less conical shape having a broad base at its end portion which is located at the head and which decreases along the axis of the main portion. Preferably form the vanes an apex at the distal end of the fastening device. A sharp, pointed end portion will make it easier to fit the fastening device into the mounting aperture and may thus be used as a pointer in order to direct the fastening device into a proper position if the inside of the aperture is provided with some kind of guiding rail or guiding hole which is adapted to guide the apex, and thus the fastening device, to a desired position. It is however not necessary that the guiding elements are arranged such that they form a sharp point but in certain cases it may be desired to have a fairly blunt end point such that its shape essentially corresponds to a truncated cone. A blunt point, or truncated cone, will on the one hand side make it more difficult to insert the clip in the mounting aperture while on the other hand side it means that the guiding may be better when the clip once is positioned in the aperture since the fastening device will automatically be guided to a more central position as soon as the fastening device is at least partly inserted in the mounting aperture due to the fact that the free motion margin between the edge of the aperture and the guiding arrangement is smaller from the start in this case.

The design of the shape of the fastening device will make it possible to adapt it easily to comprise a more blunt apex since it only implies that the vanes which are comprised in the guiding element are cut off at an appropriate distance from its base end (or, which may seem more logical, are moulded in such a way) such that a blunt apex (truncated cone) is achieved.

According to still an embodiment, which may be combined with the foregoing embodiment, decreases the circumference of the circle which is defined by the vanes more rapidly in the axial direction close to the distal end of the main portion than close to its base end. It is generally intended that the guiding element at its base end is designed such that its resulting fitting diameter essentially corresponds to the diameter of the aperture. In order to be able to guide the fastening device as desired by the guiding element should the resulting diameter of the guiding element be more or less of the same magnitude as the diameter of the aperture and the guiding is particularly important at the point when the flexible elements start to be in contact with the edge of the aperture in order to avoid that the resilient elements are pressed too hard against the edge and may be damaged. Since the flexible elements often are located at the base end or at least are most stressed during the insertion when the base end is fairly close to the rim of the aperture, is it desired that the guidance is stable at this stage and the free motion margin between the edge of the aperture and the guiding element shall be small. It is thus a desire in most cases that the circumference of the circle which is defined by the vanes, to which the resilient elements are attached, is essentially of the same magnitude along the axial extension of the fastening device and that the circumference of the circle defined by the vanes only allows a fairly small free motion margin between the edge and the guiding arrangement.

It is also desirable in most cases that the fastening device is guided concentrically into the aperture. This may be achieved for example by placing the radially peripheral parts of the vanes, as viewed from the centre point of the main portion, at an essentially equidistant spacing from the main portions centre point as seen along planes which are perpendicular to the extension of the main portion in the axial direction, i.e. from its base end to its distal end. The peripheral parts of the vanes are thus located essentially at the same periphery in an imaginary circle centred concentrically around the main portion along the axial extension of the main portion.

According to another embodiment are also the bases of the vanes concentrically placed around the centre of the main portion at its base end and having equidistant spacing between each other such that the bases of the vanes form conform geometries between the different bases. This will lead to that the guidance will be evenly distributed in all directions and, provided that the resilient elements also will be distributed equidistantly around the periphery, also the locking will be satisfactorily distributed in order to withstand loads around the aperture in a fairly similar manner.

According to one embodiment is the guiding element constructed such that it is rigid and may absorb fairly large loads without breaking. When designing is it thus easy to find a suitable design in order to provide well functioning guiding elements since there are actually no other specifications concerning its structural strength than it shall provide a rigid guiding and in a safe and secure manner locating the fastening device in the correct position when it is mounted.

A reason for allowing to mainly focusing on considering rigidity and structural strength of the guiding elements is that the guiding elements and the resilient elements are separate units. This separation of functionality between different constructional details will also make it possible that the resilient elements also may be more specifically designed in order to be flexible, resilient locking devices which not need to comprise any guiding function.

Even though they of course will be in contact with the edge of the aperture when they will be pressed through the aperture, it will be the guiding elements which will absorb the load in a case the fastening device will be pressed slantingly or in any other way be subjected to forces.

According to one embodiment are the resilient elements attached to the vanes along the axial direction of the fastening device to the radially peripheral parts of the vanes as viewed from the centre of the main portion. The resilient elements are in this case for example attached such that they extend in a direction essentially parallel to a tangent to the periphery of the circle. In this case particularly, but also applicable in other embodiments, may the resilient elements be shaped such that its surface looks like or essentially follows the envelope surface of the cone- or cylinder shaped figure which is defined by the circular projections of the peripheral parts of the vanes along the axial direction of the main portion where the resilient elements are located. In order to be able to use the resilient elements for locking of the fastening device in its locking position should at least some part of the resilient elements be located radially outwards of the radius of the guiding arrangement and of course have a relaxed position such that it is radially beyond the radius of the mounting aperture in order to lock the fastening device in the aperture by being in contact with the rim of the aperture. This may for example be done by allowing the shape of the elements to be somewhat less bent than the radius of the guiding arrangement and the mounting aperture. Alternatively, or in combination with the foregoing, may the resilient elements protrude in a direction which is slightly displaced radially outwards instead of to be in line with a tangent to the periphery of the aperture or the periphery which is defined by the guiding elements such that the resilient element will be located outside the radius of the aperture and the guiding arrangement. According to still another alternative, which may be used in combination with some or both of the earlier alternatives or by itself, are the resilient elements on its outer side provided with a wedge shaped contour which wedgeshape is designed such that the wedge extends in axial direction essentially parallel to the axial direction of the main portion having its thin portion of the wedge closest to the distal end of the main portion and its thick portion closest to the base end of the main portion. This element is thus adapted to, when inserted, compress the resilient elements and when the fastening device have been inserted a sufficient distance will the shoulder at the rear part of the wedge pass through the rim of the aperture whereby the resilient elements will resiliently move back and provide a locking which prevents that the fastening device may detach from the aperture. Presumably is the wedge located at the side facing radially outwards of the resilient element at the side which is furthest away from its attachment to the vanes of the guiding elements such that a resulting long distance between the force receiving points (a long lever arm) may be used and thus make the insertion of the fastening device into the aperture easier. It is however obvious to the skilled person in the art that there are several different alternative solutions in how to design the resilient elements such that they will perform a suitable locking by providing its outer side with different profiles and contours. In order to make use of the particular benefits associated with the present fastening device is it however recommended that these structures are located at the side of the resilient element which is located furthest away from the attachment to the vane even though it will also be possible to locate it at other positions.

The fastening device is in particular designed bearing in mind that it shall be possible to be manufactured in an easy way by the use of injection moulding or compression moulding from a plastic or polymeric material. By thoroughly considering on the one hand the functionality and on the other hand which geometries which are able to injection mould in an easy manner making a single piece element, the present fastening device has been developed, which is a single piece fastening device, and provides a fastening device which is possible to mould in one single piece in a one-step-method.

Below follows a disclosure of a specific embodiment of the invention in which the fastening device has been provided with 3 vanes which makes up the guiding arrangement. It is obvious that the invention also could be performed with further vanes, for example 4, 5, 6 or more, and with further resilient elements. However, the number of vanes and resilient elements does not need to be the same and it is for example possible to imagine three vanes of which each one has been provided with two resilient elements or that 6 vanes are used and only every second vane has been provided with a resilient element. It may however be difficult to use numerous vanes, and thereto attached resilient elements, for fastening devices having small dimensions since it may be difficult to manufacture very delicate and advanced structures in an easy way. The described fastening devices is intended to function in holes or apertures having a diameter of about 8 mm and it is thus often hard to manufacture such fastening devices provided with too many vanes or an overall complicated geometry. Even though the fastening devices are intended for fairly small apertures is it obvious that it should function in larger apertures or holes. As a general rule it may be stated that a clips or fastening device which may be manufactured and used in a small hole or aperture may be scaled up and be used in a larger hole since such a manufacturing process as injection moulding or compression moulding allows easily to scale up a structure while it is often associated with complications to scale down the size of a functioning clip such that it may be made using simple means and a simple process.

EMBODIMENT OF THE INVENTION

Figure 1:
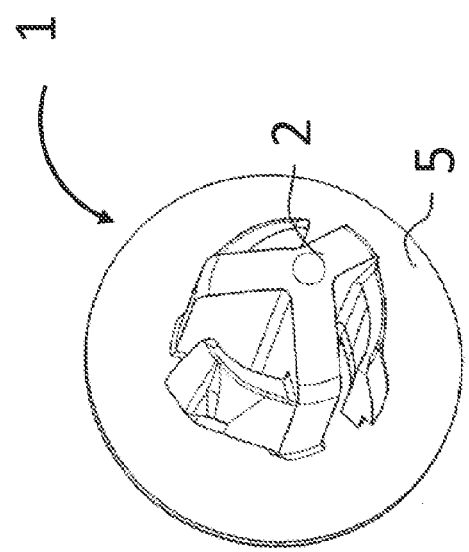
FIG. 1 describes a perspective view of a fastening device according to the invention FIG. 2 describes a perspective view of a fastening device according to the invention FIG. 3 describes a perspective view of a fastening device according to the invention FIG. 4 describes a cross sectional view of a fastening device along line B-B in FIG. 9
Figure 2:
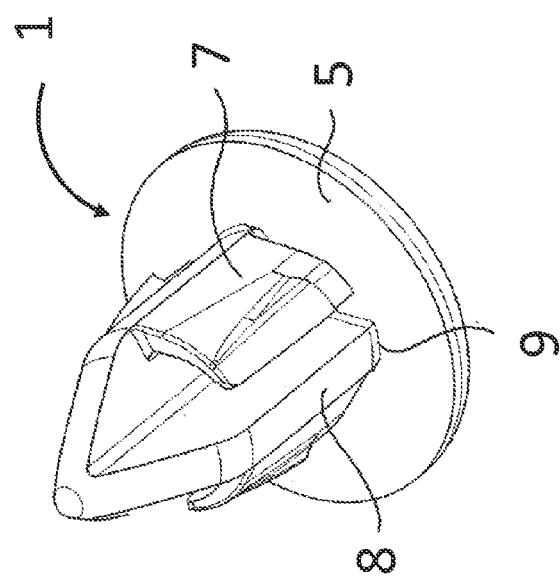
Figure 3:
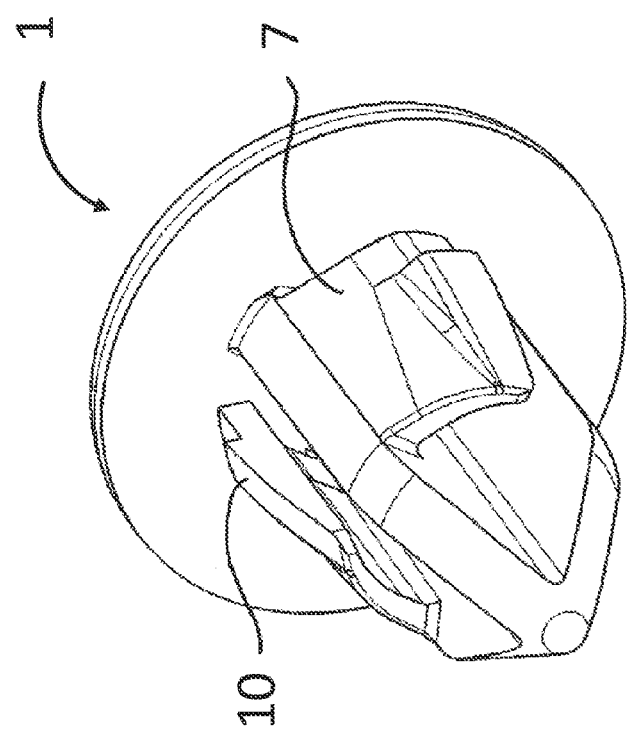

In FIG. 1-9 is described an embodiment of a fastening device 1 according to the invention. In FIG. 1 is described the fastening device 1 comprising a main portion 2 and a head 5.

Figure 5:
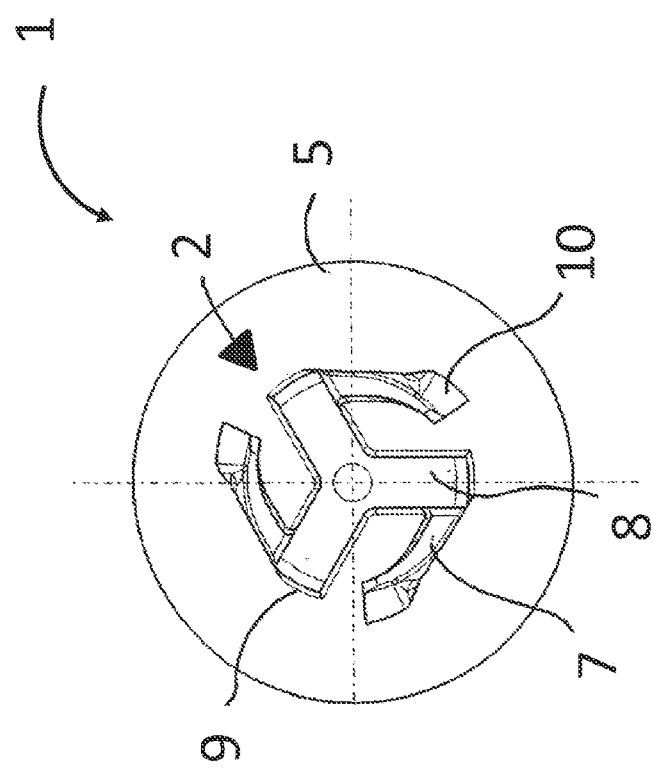
FIG. 5 describes a view of a fastening device according to the invention as seen in its axial direction from the pointed side of the fastening device FIG. 6 describes a side view of a fastening device according to the invention FIG. 7 describes a perspective view of a fastening device according to the invention FIG. 8 describes a perspective view of a fastening device according to the invention FIG. 9 describes a perspective view of a fastening device according to the invention
Figure 6:
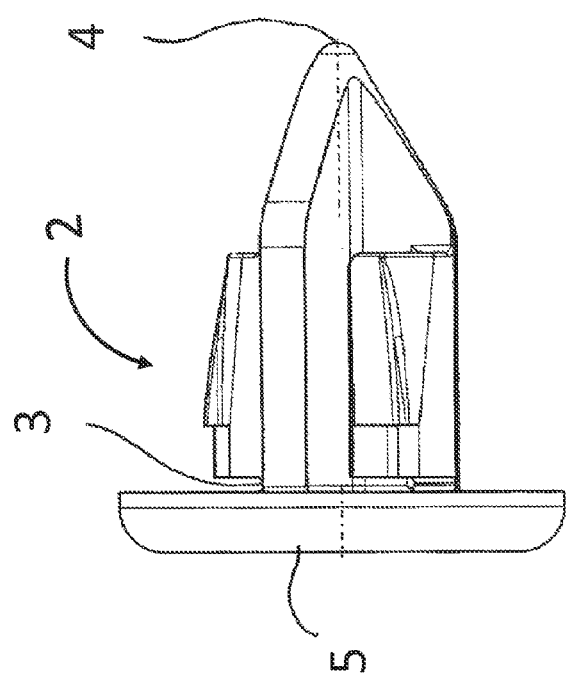
Figure 7:
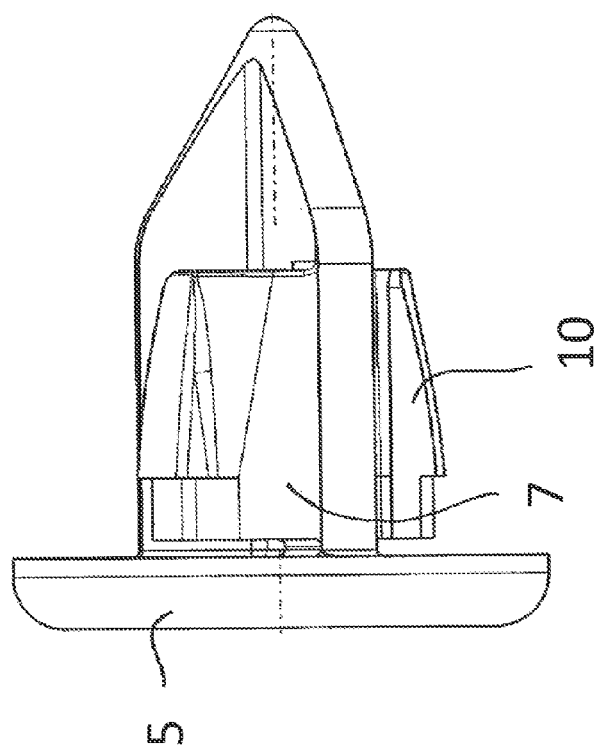
Figure 8:
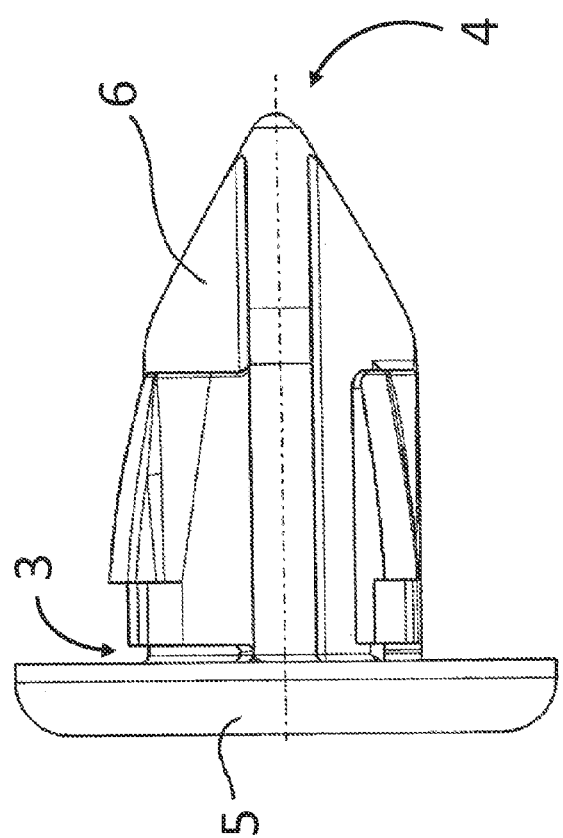

It is most clearly shown in FIG. 6 that the main portion 2 is provided with a base end portion 3 and a distal end portion 4. The main portion 2 comprises guiding elements 6 and resilient elements 7. In the disclosed embodiment comprises the guiding element three vanes 8. The construction of the main portion 2 is probably most clearly shown in FIG. 4 wherein a cross sectional view of the main portion 2 comprising the guiding element 6 is shown as the lined area comprising three vanes 8 and three resilient elements 7 attached to the vanes 8. The vanes 8 are spaced apart equidistantly from each other on the surface of the head 5 such that the peripheral parts of the bases 9 of the vanes 8 (most clearly shown in FIG. 2) are located at an equidistant distance from the centre of the main portion 2 (most clearly shown in FIG. 5) and thus are located on the periphery of a circle having its centre in the centre point of the main portion. Furthermore, the resilient elements 7 are provided with a wedge shaped part 10 (most clearly shown in FIG. 3) which main purpose is to assure a secure locking of the fastening device when it is mounted in an aperture.

Figure 4:
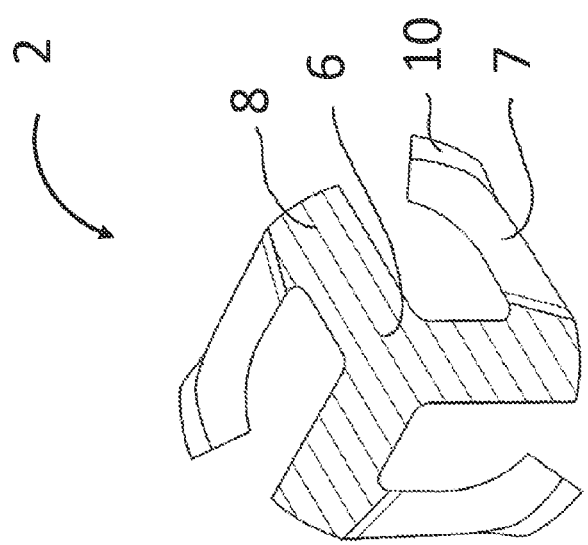

FIGS. 4 and 5 are probably the most suitable in order to describe the function of the fastening device 1 when it is inserted and attached in a mounting aperture or the like. When the fastening device is mounted in the aperture, it is inserted with the distal end 4 of the main portion first (i.e. the sharp pointed end). In case the fastening device 1 not is centered in the aperture, the vanes 8 of the guiding element 6 will be in contact with the edge of the aperture and thus adjust and centre the position of the fastening device. Since the vanes 8 are fairly inclined with respect to each other will a coarse adjustment of the position of the fastening device occur rather rapidly when it is inserted into the aperture. When the fastening device 1 has been inserted more or less half its distance is it fairly well centred (provided that the size of the mounting aperture is adapted to the size of the fastening device) and the outer surfaces of the vanes 8 at this position extends fairly parallel to each other and its radial distance to the centre of the main portion increases fairly little when moving along the axial extension of the main portion in the direction towards the head 5. At essentially the same position along the axial extension of the fastening devices 1, where the outer sides of the vanes 8 change its inclination with respect to the surface of the heads 5, is one end point of the attachment line along which the resilient elements 7 are attached to the vanes 8. This feature renders the fastening device 1 to be adequately centred before the edge of the aperture will be in contact with the resilient elements 7. The fastening device 1 may thus be further inserted being adequately centred by means of the three vanes 8. The resilient elements 7 are attached to the vanes 8 along a line which is essentially parallel to the axial direction of the main portion 2 and extends from the point where the outer side of the vanes 8 change its inclination to a position close to and above the bases of the vanes 9 at the head 5. This attachment of the resilient elements 7 lead to a fairly evenly distribution of forces along the periphery of the fastening device 1 (the resilient elements are compressed at 3 positions on an equidistant spacing along the periphery of the aperture) as well as along the axial extension along the fastening device 1 when it is inserted into the aperture since the distance between the attachment point of the resilient elements 7 to the fastening device 1 and the contact surface of the fastening device and the edge of the aperture is the same, or essentially the same, during the complete insertion procedure. An important reason why the distribution of forces may be evenly distributed during the insertion is that the resilient elements 7 not are attached rigidly to the head 5 along the side of the resilient elements 7 which extends along the surface of the head 5.

FIGS. 1-9 thus describes an embodiment of the invention showing the principle of not attaching the resilient elements 7 to the fastening device 1 at the end close to the head 5 along a line or periphery along a plane essentially perpendicular to the axial direction, for example along the periphery of the head or to the surface of the head.

It is obvious that the invention may be modified in several different ways. It is for example obvious that the head may be modified in several different ways, e.g. it may be provided with a number of discs in order to form one or several so called clip pockets. It is also obvious that a number of main portions may be attached to the very same "head", e.g. a number of main portions may be attached to a panel or cover such that it may be directly mounted and attached to a door frame structure or any other structure comprising mounting apertures at locations corresponding to the locations where the main portions of the fastening device are located on the panel or the cover. Even though the use of three vanes is disclosed in the embodiment whereof each one is provided with a resilient element for locking of a fastening device is it also possible to make use of further vanes. It is also possible to provide each vane with more or less resilient elements. For example, in case four vanes are used, it would be possible to only provide two of these vanes, preferably two of them which are located opposite to each other, with one resilient element each extending in the same direction of rotation such that they will perform a locking action together with the rim of the aperture at diametrically opposite sides. It is also imaginable, in particular when four vanes are used, to allow two resilient elements to protrude in different directions from two opposite vanes such that two pairs of diametrically opposed resilient elements are formed such that the fastening device is attached at four places along the rim of the aperture.

There are thus a number of different ways of how to realise the invention wherein the fastening device is provided with a plurality of vanes which are rigid and are used for guiding of the fastening device in the aperture whereof at least some of the vanes are provided with a resilient element. The resilient elements function as a locking element of the fastening device when it is mounted in an aperture and the resilient element is attached to the vanes along a line essentially parallel to the direction of insertion such that the rigidity of the whole resilient element may be essentially constant during the whole insertion distance while the resilient elements are in contact with the edge of the aperture. This may be easy to realise when studying the figures where the principles of the solution is shown. The figures disclose that the attachment of the resilient elements 7 is made along a line which is essentially parallel to the direction of insertion. The distal side of the resilient element, which is the part intended to be in contact with the edge of the aperture while inserting the fastening device such that the resilient element are bent inwards and may pass the edge of the aperture, comprises the wedge shaped contour 10 having a direction of extension essentially parallel to the line of attachment. There is thus a distance between the attachment point and the distal end, whereby it is realized that the distance between the contact surface of the resilient element and the edge of the aperture and its point of attachment to the fastening device (the vanes) is essentially the same during the whole insertion procedure. This makes it possible to easier adapt the force needed for insertion of the fastening device through the aperture to be more equal during the complete insertion procedure and thus provide an easier and more reliable mounting.

The invention claimed is:

1. A fastening device comprising
a main portion having an axial extension from a base end to a distal end of the main portion, the main portion configured to be brought into an aperture or a slot having a size adapted for the fastening device, and
a head comprising a single flange, attached to the main portion at the base end of the main portion, and configured to be in contact with a rim of the aperture on one side of the aperture when the fastening device is located in the aperture;
the main portion comprising
a guiding element for guiding the fastening device when the fastening device is brought through the aperture, and
resilient elements configured
to be pressed inwardly towards a center of the main portion when the main portion is entering through the aperture,
to be resiliently moved back when the resilient elements have passed the rim of the aperture, and
thus to provide a locking of the fastening device by being in contact with the rim on an opposite side of the aperture,
the guiding element comprising
at least three vanes, each having a base attached to the main portion, and a peripheral part, as viewed from the center of the main portion,
wherein
the bases are located essentially at an equidistant spacing from the center of the main portion and located essentially at the same periphery in a circle around the main portion;
each of the resilient elements comprises a segment attached to one of the at least three vanes, respectively, along one side of said segment; and
the segments protrude from the respective vanes and extend in a direction towards an adjacent vane along a single direction, wherein
an empty gap is located between the single flange of the head and the segments of the resilient elements.

2. A fastening device according to claim 1, wherein each of the resilient elements is attached to the respective vane along a line which essentially extends in an axial direction of the main portion.

3. A fastening device according to claim 1, wherein each of the resilient elements are attached to the respective vane along a line which essentially stretches along the extension of the fastening device and the main portion in the axial direction.

4. A fastening device according to claim 1, wherein each of the at least three vanes is shaped such that an extension of the vane in a radial direction decreases along an axial direction from the base end of the main portion to the distal end of the main portion.

5. A fastening device according to claim 4, wherein the circumference of the circle, which is defined by the vanes, decreases more rapidly in the axial direction closer to the distal end of the main portion than to the base end of the main portion.

6. A fastening device according to claim 1, wherein the circumference of the circle which is defined by the vanes is essentially of the same magnitude along its axial extension of the main portion at which the resilient elements are attached.

7. A fastening device according to claim 1, wherein the peripheral parts, as viewed from the center of the main portion, are located essentially at an equidistant spacing from the center of the main portion along the axial extension of the main portion in an axial direction from the base end to the distal end of the main portion such that the peripheral parts of the vanes are located essentially at the same periphery in the circle around the main portion along the axial extension of the main portion.

8. A fastening device according to claim 1, wherein the guiding element is not resilient.

9. A fastening device according to claim 1, wherein the guiding element and the resilient elements are separate units.

10. A fastening device according to claim 1, wherein the resilient elements are attached to the vanes along the axial direction of the main portion.

11. A fastening device according to claim 1, wherein the fastening device is an injection moulded product of a polymer.

12. A fastening device according to claim 1, wherein the fastening device is made by a plastic material.

13. A fastening device according to claim 1, wherein
the bases of the vanes are concentrically located around the center of the main portion at the base end of the main portion, and have an equidistant spacing between each other such that the bases of the vanes form conform geometries between the bases.

14. A fastening device according to claim 1, wherein the resilient elements are shaped such that their surfaces follow the envelope surface of the cone- or cylinder-shaped figure which is defined by the circular projections of the peripheral parts of the vanes along the axial extension of the main portion where the resilient elements are located.

15. A fastening device according to claim 1, wherein
each of the resilient elements has an wedge shaped contour which extends in a direction essentially parallel to the axial direction of the main portion, and has a thinner portion of the wedge closest to the distal end of the main portion and a thicker portion closest to the base end of the main portion.

16. A fastening device according to claim 1, wherein
the segments of the resilient elements are unrestrained at portions closest to the single flange of the head.

17. A fastening device according to claim 1, wherein
the segments of the resilient elements include a side exterior surface that faces the single flange of the head.

18. A fastening device according to claim 1, wherein
the segments of the resilient elements are connected to the rest of the fastening device only by the respective vanes.

19. A fastening device according to claim 1, wherein
the vanes are directly connected to the head.

20. A fastening device according to claim 1, wherein a bottom surface of the single flange of the head extends in a direction normal to a longitudinal axis of the fastening device, wherein the vanes extend away from the longitudinal axis.

21. A fastening device according to claim 1, wherein the resilient elements are not directly attached rigidly to the single flange of the head.

22. A fastening device according to claim 1, wherein the resilient elements include a first surface that faces a second surface of the single flange of the head opposite the first surface such that the first surface is visible from the second surface and the second surface is visible from the first surface.

23. A fastening device according to claim 1, wherein the main portion of the fastening device is configured to be placed into the aperture, wherein the single flange of the head is configured to directly contact the structure immediately proximate the aperture, and wherein the segments of the resilient elements are also configured to directly contact the structure immediately, proximate the aperture at a location immediately opposite from that where the single flange of the head contacts the structure.

* * * * *